US005890814A

United States Patent [19]

Catlett

[11] Patent Number: 5,890,814

[45] Date of Patent: Apr. 6, 1999

[54] SUPPORT RING MOUNT FOR ROTATING DRUM

[75] Inventor: Gary Catlett, Louisville, Ky.

[73] Assignee: GenTec, Inc., Louisville, Ky.

[21] Appl. No.: 922,608

[22] Filed: Sep. 3, 1997

[51] Int. Cl.[6] .............................. F16C 13/00; F27B 7/00; F16H 55/00

[52] U.S. Cl. ............................ 384/549; 34/108; 432/103; 474/162; 474/902

[58] Field of Search ............................... 384/549; 474/94, 474/139, 237, 162, 902, 903; 74/447; 34/108; 432/103

[56] References Cited

U.S. PATENT DOCUMENTS

| | | | |
|---|---|---|---|
| 2,793,920 | 5/1957 | Haaff | 384/549 |
| 2,999,396 | 9/1961 | Kaczmarski | 474/139 |
| 3,220,273 | 11/1965 | Christian | 474/162 |
| 3,247,601 | 4/1966 | Sims | 384/549 X |
| 3,384,356 | 5/1968 | Durinck | 432/103 X |
| 3,439,551 | 4/1969 | Militana | 474/162 |
| 3,561,741 | 2/1971 | Richardson | 74/447 |
| 3,840,336 | 10/1974 | Brachthauser | 384/549 X |
| 3,860,303 | 1/1975 | Deussner | 384/549 |
| 4,143,973 | 3/1979 | Hauser | 366/54 |
| 4,265,031 | 5/1981 | Kirchhoff | 34/108 |
| 4,320,586 | 3/1982 | Kobting | 34/108 |
| 4,500,285 | 2/1985 | Klotmann et al. | 34/108 X |
| 4,552,508 | 11/1985 | Reid | 415/72 |
| 4,750,377 | 6/1988 | Carr | 74/433 |
| 5,581,902 | 12/1996 | Didion et al. | 34/136 |
| 5,607,232 | 3/1997 | Dahl | 366/63 |
| 5,733,115 | 3/1998 | Petersen | 432/103 |

*Primary Examiner*—Thomas R. Hannon

*Attorney, Agent, or Firm*—Wheat, Camoriano, Smith and Beres, PLC

[57] ABSTRACT

A rotatable drum arrangement, wherein the drum is mounted on support rings such that circumferential expansion and contraction of the drum relative to said support rings does not adversely affect the mounting. In a preferred embodiment, drum blocks are mounted to the drum, and corresponding ring blocks are mounted to the support ring. The side surfaces of adjacent drum blocks and ring blocks support the weight of the drum on the ring. In this arrangement, gaps may be maintained between the drum and support ring that allow for expansion and contraction of the drum. In the preferred embodiment, there is also a drive sprocket mounted on the drum with a sprocket mounting arrangement that also accommodates expansion and contraction of the drum.

9 Claims, 4 Drawing Sheets

SUPPORT RING MOUNT FOR ROTATING DRUM

BACKGROUND OF THE INVENTION

Hollow, rotatable, cylindrical drums are often used in the asphalt industry and in other industries for heating or mixing bulk materials. These drums are typically supported on a base by a plurality of support rings, which encircle the drum. Usually, there is a mounting arrangement which fixes the support ring to the drum. There are often problems with these mounting arrangements, because the drum is often rapidly heated and cooled, causing it to expand and contract relative to the support ring. Depending upon the mounting arrangement used, the expansion and contraction of the drum relative to the support ring may cause mounting bolts to pull free, may cause welds to fail, and/or may cause the drum to distort.

U.S. Pat. No. 4,365,031 issued to Kirchoff describes one attempt at ameliorating problems related to expansion and contraction of the drum relative to the support rings. In that reference, wedges are mounted to both the drum and support ring, and the drum is supported on the ring by the inclined surfaces of the wedges. There is a radial gap between the wedges mounted on the drum and the support ring, so that the drum can expand and the drum wedges can shift radially outwardly without pressing against the inside of the support ring. However, there are several problems with this reference that are ameliorated by the present invention.

First, if it is necessary to remove the ring of Kirchoff to repair it, it is difficult to remove and cannot be removed without losing the alignment between the ring and the drum. Second, the Kirchoff design requires substantial labor to cut the metal pieces into wedge shapes, and, because the pieces have to be cut, the final finish would be rough, which does not provide good surface contact. This leads to plastic deformation, which increases the gap between the wedges, causing the drum to be eccentric with the support ring, which adversely affects the drive alignment. Third, the Kirchoff design requires many wedge-shaped pieces to be mounted on the ring and the drum, which involves substantial labor and material expense. Fourth, the Kirchoff design makes it difficult to install the ring on the drum so as to ensure proper alignment of all the wedges.

SUMMARY OF THE INVENTION

The present invention provides a mounting arrangement for securing one or more support rings to the drum so that the drum is firmly supported by the rings; this mounting arrangement further accommodates expansion and contraction of the drum relative to the support ring.

The preferred mounting arrangement of the present invention supports the drum by means of blocks mounted on the drum and the ring. The drum blocks and ring blocks are meshed with one another so that support of the drum is achieved through substantially tangentially-directed forces between the blocks. There is ample space between the ring blocks and the drum and between the drum blocks and the ring to permit the drum to expand outwardly without harming the mounting arrangement or distorting the drum.

The mounting arrangement of the present invention permits the support ring to be readily removed for repairs without losing the alignment between the support ring and the drum. The mounting arrangement of the present invention also permits the use of standard, off-the-shelf, cold drawn bar stock. This greatly reduces labor costs, because the standard material does not have to be cut at an angle as in the prior art. Also, the off-the-shelf material has a smooth surface finish, which means that there is better surface contact, less plastic deformation, and fewer problems of increasing the gap and eccentricity of the drive. The mounting arrangement of the present invention also requires fewer attachments to be made to the support ring and drum while still permitting the drum to be supported for rotation in both directions.

DESCRIPTION OF THE PREFERRED EMBODIMENTS

Figure 1:
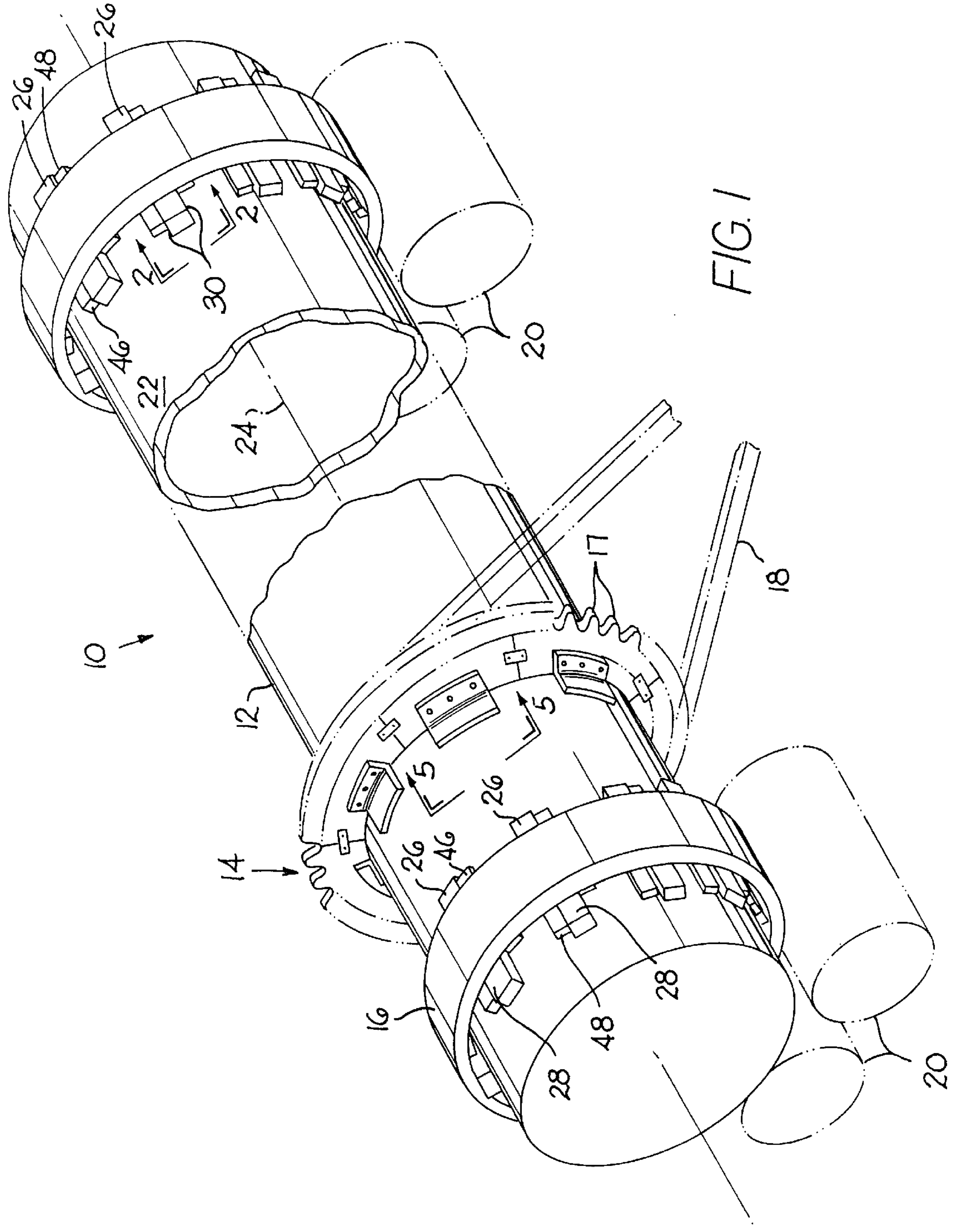
FIG. 1 is a broken-away perspective view of a rotatable drum arrangement made in accordance with the present invention.
Figure 9:
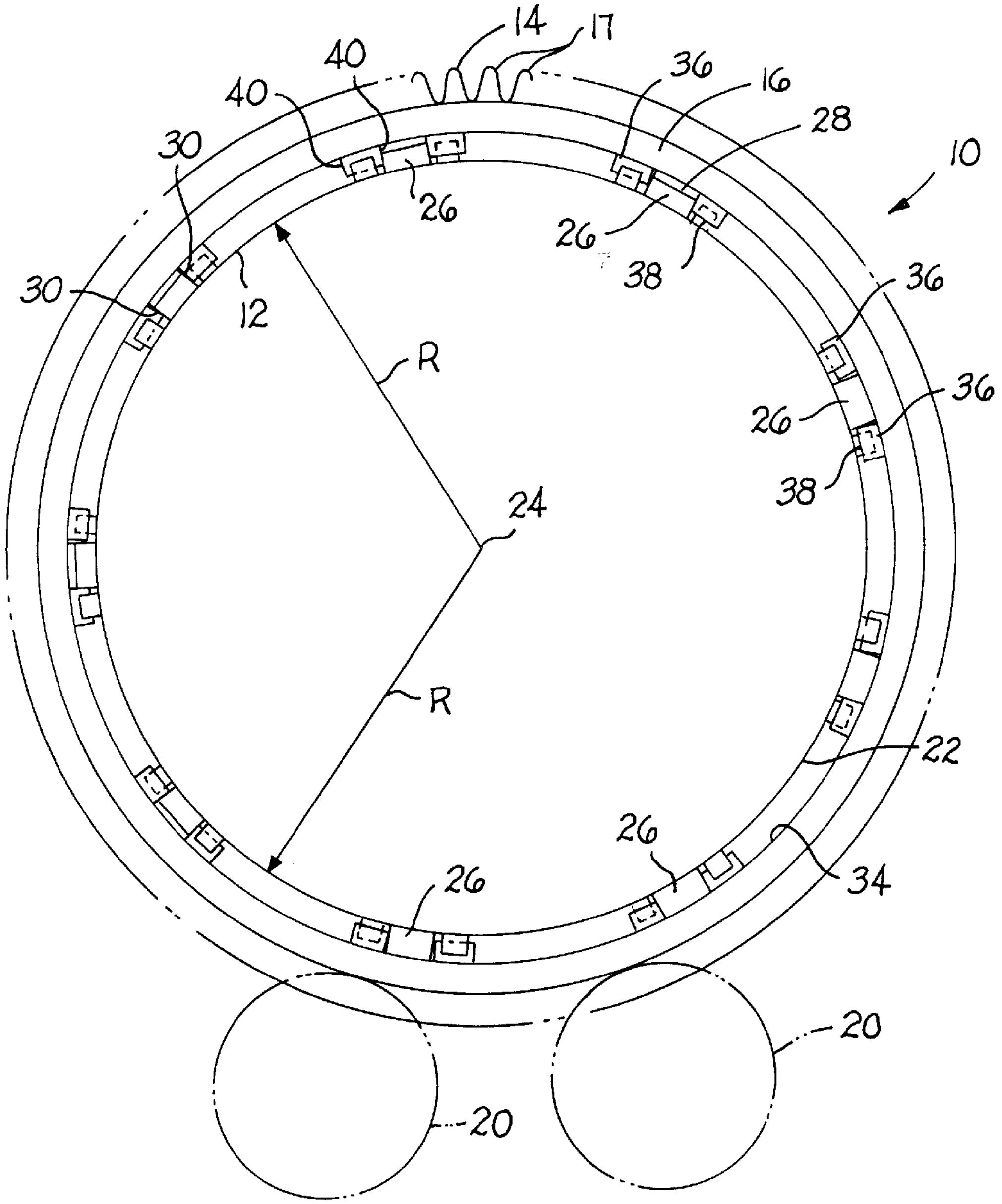
FIG. 9 is a schematic end view of the drum arrangement of FIG. 1.

FIGS. 1 and 9 show a rotatable drum arrangement 10 that includes a drum 12, a drive sprocket 14 mounted on the drum 12, and a plurality of support rings 16 mounted on the drum 12. While only some of the sprocket teeth 17 are shown, it is understood that the teeth 17 are evenly spaced around the entire circumference of the sprocket 14. A chain 18, driven by a motor (not shown), rotates the drive sprocket 14, which, in turn, rotates the drum 12. The support rings 16 encircle the drum 12 and rest upon rollers 20 (shown in phantom), which provide support for the weight of the drum 12.

Rapid heating and cooling of the drum 12 often leads to expansion and contraction of the drum 12 relative to the support rings 16 and sprocket 14. To maintain the appropriate support for the drum 12, the support rings 16 must be secured so as to accommodate this expansion and contraction of the drum 12. The mounting arrangement for the drive sprocket 14 should also accommodate expansion and contraction of the drum 12 relative to the drive sprocket 14.

Figure 2:
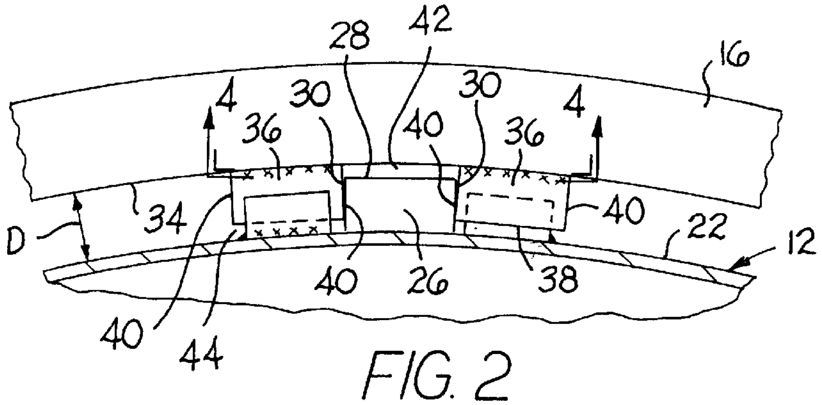
FIG. 2 is a broken-away view taken along section 2—2 of FIG. 1.

In the preferred embodiment of FIGS. 1 and 9, the cylindrical drum 12 has an outer surface 22 and defines an axis of rotation 24. At any given axial location, the drum 12 has a circular cross-section and defines a plurality of radii R, that extend from the axis 24. At the axial location of each support ring 16, a plurality of drum blocks 26 is secured to the outer surface of the drum 12, preferably by welding. The drum blocks 26 are spaced at regular intervals around the circumference of the drum. In a preferred embodiment, the drum blocks 26 are spaced at 20 degree intervals. Each of these drum blocks 26 preferably is made from cold drawn bar stock, has an outer surface 28 and a pair of substantially radially-directed side surfaces 30, as best shown in FIG. 2.

Referring again to FIG. 2, each support ring 16 encircles the drum 12 and has an inside diameter greater than the outside diameter of the drum 12, so that the inner surface 34 of the support ring 16 is spaced a substantial radial distance D away from the outer surface 22 of the drum 12. A plurality of ring blocks 36 is secured to the inner surface 34 of the support ring 16, preferably by welding. Each ring block 36 has an inner surface 38 and a pair of substantially radially-directed side surfaces 40. The ring blocks 36 are secured to the inner surface 34 of the support ring 16, such that, when the support ring 16 is installed on the drum 12, the ring blocks 36 are positioned so as to abut both sides of each drum block 26. Thus, when installation of the support ring 16 is complete, the drum blocks 26 and ring blocks 36 mesh such that there is surface-to-surface contact between the substantially radially-directed side surfaces 30, 40 of the respective blocks.

It should be noted that, in order to make the drawings clear, some of the drum blocks and ring blocks have been eliminated. As shown, a gap 42 is maintained between the outer surface 28 of each drum block 26 and the inner surface 34 of the support ring 16. A similar gap 44 is maintained between the inner surface 38 of each ring block 36 and the outer surface 22 of the drum 12. These gaps 42, 44 allow for the radial movement of the drum 12 relative to the support ring 16. The weight of the drum 12 is supported by tangentially-directed forces acting between the respective radially-directed side surfaces 30, 40 of the drum blocks 26 and ring blocks 36. It can be seen that this arrangement provides support for the drum 12 whether it is driven clockwise or counterclockwise, and these tangentially-directed forces keep the drum 12 coaxial with the support ring 16, so that the outer surfaces 28 of the drum blocks never contact the inner surface 34 of the support ring 16, and the inner surfaces 38 of the ring blocks never contact the outer surface 22 of the drum, even as the drum 12 expands relative to the ring 16.

The preferred method of installation comprises the following steps: First, the ring blocks 36 are welded to the inner surface of the support ring 16 at the desired intervals. Inner retaining blocks 46 are welded onto the drum at the appropriate axial position. The support ring 16 is then slipped over the end of the drum 12 until the ring blocks 36 abut their respective inner retaining blocks 46. Temporary wedges (not shown) are then inserted between the ring 16 and the drum 12 to position the ring 16 coaxially with the drum 12. The drum blocks 26 are then welded into place, with each drum block 26 fitting snugly between a pair of ring blocks 36, ensuring that the drum blocks 26 and ring blocks 36 are properly aligned.

Figure 3:
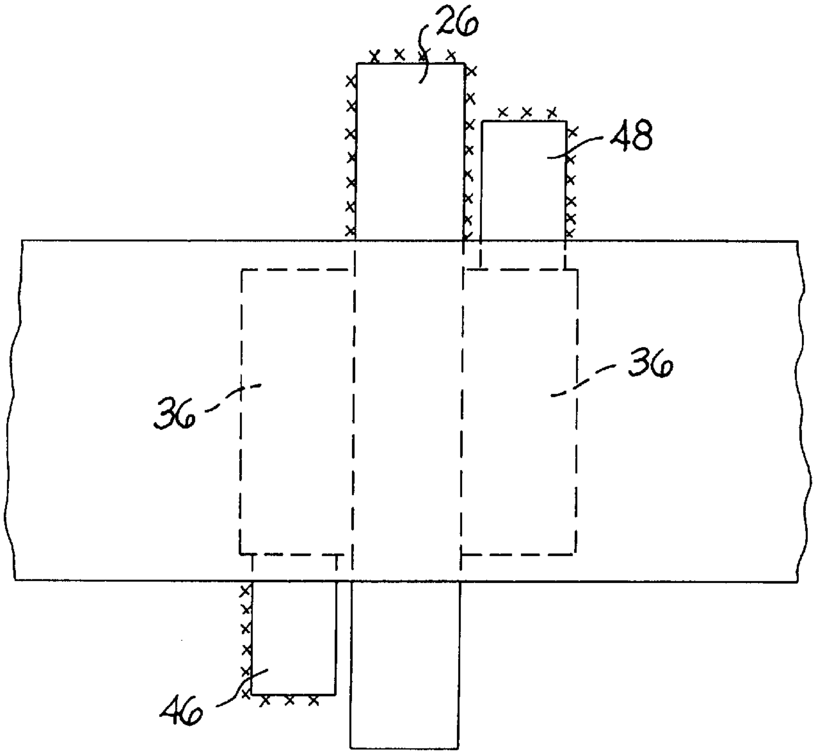
FIG. 3 is a top view of the portion shown in FIG. 2.
Figure 4:
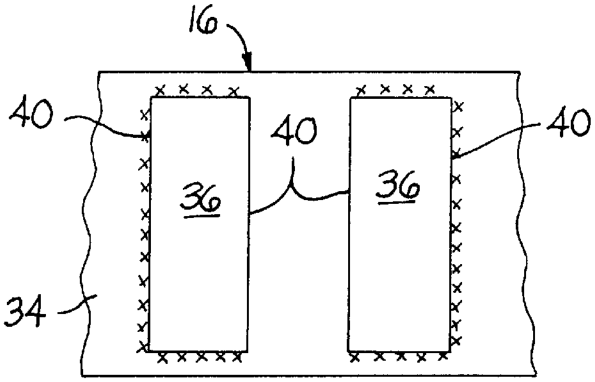
FIG. 4 is a view taken along the line 4—4 of FIG. 2.

Then, the outer retainer blocks 48 preferably are welded, or otherwise fixed, to the drum 12 opposite their respective ring blocks 36. The inner and outer retainer blocks 46, 48 limit axial movement of the support ring 16 relative to the drum 12. The retaining blocks 46, 48 are best shown in FIG. 3. As was mentioned above, the inner retaining blocks 46 preferably are fixed to the drum 12 prior to slipping the support ring 16 over the drum 12, and the outer retaining blocks 48 preferably are fixed to the drum 12 on the other side of the support ring 16 after the ring 16 is placed over the drum 12. The temporary wedges are then removed. The retaining blocks 46, 48 are aligned with respective ring blocks 36, as best shown in FIG. 3, limiting the axial movement of the support ring 16 relative to the drum 12. Alternatively, the retaining blocks 46, 48 could be mounted on the support ring 16 opposite the drum blocks 26 (not shown).

As was mentioned earlier, it is also desirable to accommodate expansion and contraction of the drum 12 relative to the drive sprocket 14. Referring to FIGS. 5–8, the drive sprocket 14 is made up of arcuate segments, which are fastened together. The assembled sprocket 14 has an inner diameter that is greater than the outside diameter of the drum 12, such that the inner surface 50 of the drive sprocket 14 is spaced a substantial radial distance X from the outer surface 22 of the drum 12. The drive sprocket 14 is secured to the drum 12 using a series of mounting brackets 52 arrayed around the circumference of the drum 12 and positioned on either side of the drive sprocket 14. These mounting brackets 52 are preferably welded to the outer surface 22 of the drum 12.

Figure 6:
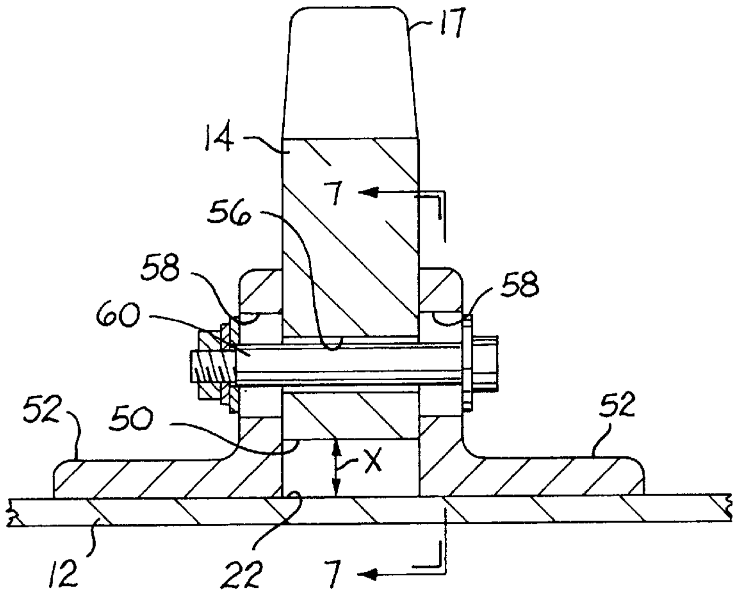
FIG. 6 is a view taken along the section 6—6 of FIG. 5.
Figure 7:
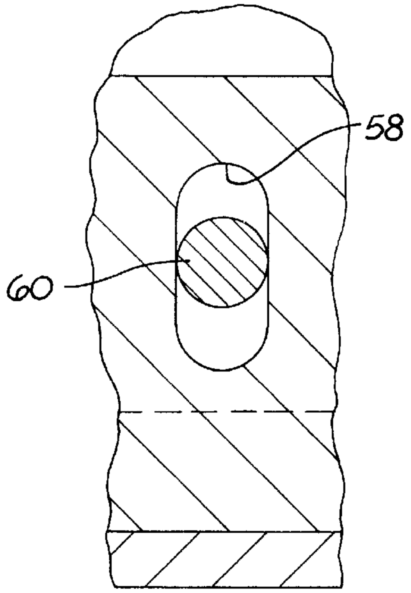
FIG. 7 is a view taken along the section 7—7 of FIG. 6.

FIG. 6 is a sectional view showing the attachment of the drive sprocket 14 to the drum 12. This view shows that there is a substantial radial distance X between the inner surface 50 of the drive sprocket 14 and the outer surface 22 of the drum 12. A plurality of holes 56 defined by the drive sprocket 14 is aligned with corresponding holes 58 defined by the mounting brackets 52 positioned on either side of the drum sprocket 14. The aligned holes 56, 58 allow for a pin connection. FIG. 6 shows a bolt 60 extending through the aligned holes 56, 58 to form the pin connection. As shown in FIG. 7, the holes 58, defined by the mounting brackets 52, are not circular. Rather, the holes 58 are elongated, with the major axis defined by said holes 58 being substantially radially directed. This arrangement allows for radial movement of the brackets 52 relative to the sprocket 14, without any binding or distortion.

Figure 5:
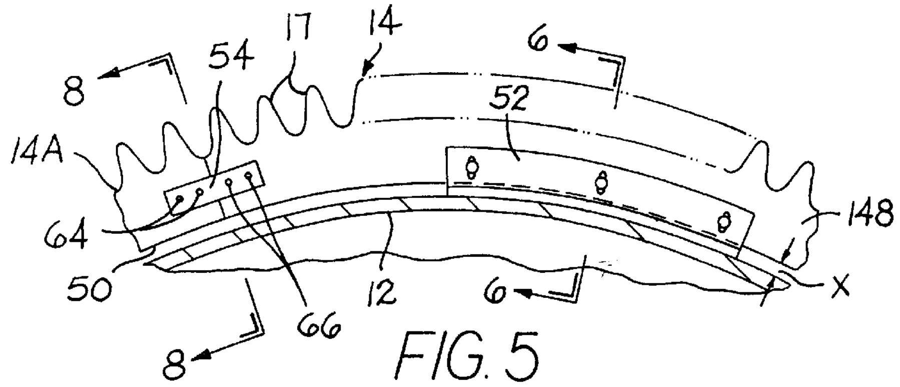
FIG. 5 is a view taken along the section 5—5 of FIG. 1, showing a portion of the drive sprocket and drum.
Figure 8:
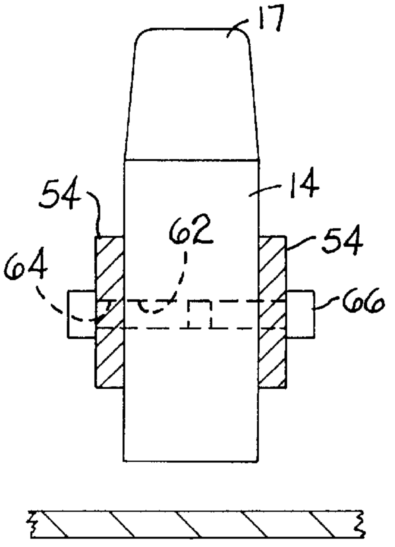
FIG. 8 is a view taken along line 8—8 of FIG. 5, showing the attachment of two arcuate sections of the drive sprocket.

Referring again to FIG. 5, the multiple arcuate sections of the sprocket 14 are connected using bands 54 positioned on either side of the drive sprocket 14. FIG. 5 shows two adjacent arcuate sections, 14A and 14B. As shown in FIGS. 5 and 8, holes 62 are defined by each of these arcuate sections 14A,14B of the drive sprocket 14 near the juncture of the two sections. The bands 54 are positioned on either side of the drive sprocket 14 and span the juncture. Holes 64 defined by the bands 54 are aligned with the holes 62 defined by the adjacent sections 14A, 14B. Pins 66 are placed through the aligned holes 62, 64 to secure the connection.

Figure 10:
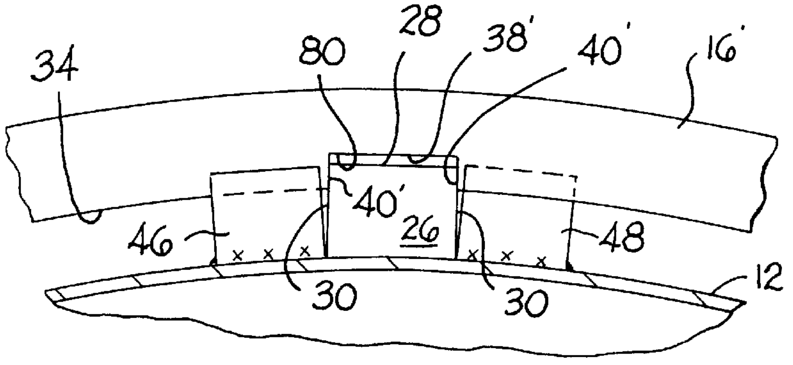
FIG. 10 is a broken-away sectional view of a second embodiment of the invention.

FIG. 10 shows a second embodiment of the mounting arrangement for the support ring, in which, instead of mounting two blocks on the inner surface of the support ring, an indentation 80 is cut into the inner surface 34 of the support ring 16'. The indentation 80 has substantially radially-directed side surfaces 40', and its inner surface 38' is sufficiently recessed that the outer surface of the drum block 26 will not reach the inner surface 38' of the recess 80 as the drum 12 expands. Again, in this embodiment, the drum 12 is supported on the ring 16' by substantially tangentially-directed forces between the ring 16' and the drum 12. This embodiment has the disadvantage that it requires more labor than the first embodiment, but it has the advantage that it can withstand greater shear forces than the first embodiment. In this second embodiment, the retaining blocks 46, 48 are fixed to the drum 12 opposite the sides of the ring 16', in order to limit the axial movement of the ring 16' relative to the drum 12.

It will be obvious to those skilled in the art that modifications may be made to the preferred embodiments described herein without departing from the scope of the present invention.

What is claimed is:

1. A rotatable drum arrangement, comprising:

a cylindrical drum, having an outer surface and defining an axis of rotation, wherein, at a given axial position, said drum has a circular cross-section and defines a plurality of radii extending from said axis;

at least one support ring encircling said drum at said given axial position, said support ring having an inner surface spaced a substantial radial distance away from the outer surface of said drum;

a plurality of drum blocks fixed to the drum around the outer surface of said drum at said given axial position, each of said drum blocks having an outer surface and two substantially radially-directed side surfaces, wherein, for each of said drum blocks, there is a substantial gap between the outer surface of the drum block and the inner surface of said support ring; and wherein said drum is supported on said ring by forces directed substantially tangentially to the outer surface of said drum acting on said substantially radially-directed side surfaces.

2. A rotatable drum arrangement as recited in claim 1, and further comprising:

a plurality of ring blocks fixed to the inner surface of said support ring adjacent to the sides of corresponding drum blocks, each of said ring blocks having an inner surface and two substantially radially-directed side surfaces, wherein there is a substantial gap between the inner surface of each ring block and the outer surface of the drum, and wherein corresponding radially-directed side surfaces of said drum blocks and said ring blocks mesh with each other, and wherein the drum may expand and contract without disturbing the mounting arrangement.

3. A rotatable drum arrangement as recited in claim 1, wherein said ring defines a plurality of notches on its inner surface, each of said notches having substantially radially-directed side surfaces abutting the respective radially-directed side surfaces of its respective drum block, and wherein each of said notches is deep enough that the drum may expand and contract without disturbing the mounting arrangement.

4. A rotatable drum arrangement as recited in claim 1, and further comprising a plurality of axial retaining blocks mounted on at least one of said ring and said drum to limit axial movement of the support ring relative to the drum, preventing the drum blocks and ring blocks from disengaging.

5. A rotatable drum arrangement as recited in claim 4, wherein said axial retaining blocks are secured to said drum on either side of said support ring.

6. A rotatable drum arrangement as recited in claim 1, and further comprising a drive sprocket that is secured to said drum, wherein there is a substantial gap between the inner surface of said drive sprocket and the outer surface of said drum.

7. A rotatable drum arrangement as recited in claim 6, wherein said drive sprocket comprises a plurality of interconnected arcuate sprocket segments, each of said sprocket segments defining at least one sprocket hole for mounting the sprocket on the drum; and further comprising a plurality of mounting brackets, each of said mounting brackets being fixed to the drum and defining at least one radially-elongated hole aligned with a corresponding sprocket hole; and a pin extending through the aligned sprocket hole and elongated hole to form a pin connection between said mounting bracket and said drive sprocket.

8. A rotatable drum arrangement as recited in claim 6, wherein said drive sprocket is comprised of a plurality of arcuate sections.

9. A rotatable drum arrangement, comprising:

a hollow, cylindrical, rotatable drum, defining an axis of rotation;

a plurality of interconnected arcuate sprocket sections mounted at an axial position of said drum, encircling said drum, wherein there is a radial gap between said drum and said sprocket sections;

each of said sprocket sections defining at least one sprocket hole for mounting the sprocket section on the drum;

a plurality of mounting brackets, each of said mounting brackets being fixed to said drum and defining at least one radially-elongated hole aligned with a corresponding sprocket hole; and a pin extending through the aligned sprocket hole and elongated hole to form a pinned connection between said sprocket section and said mounting bracket which permits expansion and contraction of the drum without damaging the mounting brackets, sprocket sections, or the drum.

* * * * *